US009200347B2

(12) United States Patent
Jang et al.

(10) Patent No.: US 9,200,347 B2
(45) Date of Patent: Dec. 1, 2015

(54) PRODUCTION METHOD FOR HIGH-PURITY CALCITE AND AMMONIUM SULPHATE BY USING GYPSUM

(75) Inventors: Young Nam Jang, Daejeon (KR); Kyung Won Ryu, Daejeon (KR); Myung Kyu Lee, Daejeon (KR)

(73) Assignee: Korea Institute of Geoscience and Mineral Resources, Daejeon (KR)

( * ) Notice: Subject to any disclaimer, the term of this patent is extended or adjusted under 35 U.S.C. 154(b) by 87 days.

(21) Appl. No.: 14/232,833

(22) PCT Filed: Jul. 13, 2012

(86) PCT No.: PCT/KR2012/005591
§ 371 (c)(1),
(2), (4) Date: Feb. 12, 2014

(87) PCT Pub. No.: WO2013/012214
PCT Pub. Date: Jan. 24, 2013

(65) Prior Publication Data
US 2014/0161692 A1 Jun. 12, 2014

(30) Foreign Application Priority Data

Jul. 15, 2011 (KR) .................. 10-2011-0070317

(51) Int. Cl.
| C01F 11/18 | (2006.01) |
| C22B 26/20 | (2006.01) |
| B09B 3/00 | (2006.01) |
| C01C 1/24 | (2006.01) |

(52) U.S. Cl.
CPC . *C22B 26/20* (2013.01); *B09B 3/00* (2013.01); *B09B 3/0041* (2013.01); *C01C 1/24* (2013.01); *C01F 11/18* (2013.01); *C01P 2002/72* (2013.01); *C01P 2002/88* (2013.01)

(58) Field of Classification Search
CPC ....................................................... C01F 11/18
See application file for complete search history.

(56) References Cited

U.S. PATENT DOCUMENTS 4,201,754 A * 5/1980 Clark ................. 423/243.02

FOREIGN PATENT DOCUMENTS

| JP | 2001-000947 A | 1/2001 |
| KR | 10-1999-0068629 A | 9/1999 |
| KR | 10-0723066 B1 | 5/2007 |
| KR | 10-2010-0008342 A | 1/2010 |

* cited by examiner

*Primary Examiner* — Stuart Hendrickson
(74) *Attorney, Agent, or Firm* — Novick, Kim & Lee, PLLC; Jae Youn Kim (57) ABSTRACT

Provided is a recycling method for producing calcite and ammonium sulfate having a high purity of at least 95% and generated by means of a carbonation reaction for fixing carbon dioxide inside the crystal structure of a mineral, and in which waste gypsum is reacted with carbon dioxide, which is a greenhouse gas, such that the carbon dioxide is fixed as a stable mineral, and high-purity calcite and ammonium sulfate are produced as resultant products.

5 Claims, 7 Drawing Sheets

PRODUCTION METHOD FOR HIGH-PURITY CALCITE AND AMMONIUM SULPHATE BY USING GYPSUM

TECHNICAL FIELD

The present invention relates to a production method for high-purity ammonium sulfate and calcite by using gypsum, in particular, waste gypsum (gypsum dehydrate, $CaSO_4.2H_2O$), and more particularly, to a method for simultaneously generating high-purity ammonium sulfate ($(NH_4)_2SO_4$) and calcite by reacting gypsum discharged after a fertilizer is produced in a fertilizer production factory or after fuel gas desulfurization is carried out in a coal-fired thermal power plant with carbon dioxide and ammonia. Further, the present invention relates to a method for storing $CO_2$ which is a main cause of global warming and producing and reusing high-purity ammonium sulfate and high-purity calcite, by using wastes such as waste gypsum.

BACKGROUND ART

The waste gypsum takes a gypsum dehydrate form and is generally named chemical gypsum and about 400,000 tons of waste gypsum annually is discharged from industries in the country which use sulfuric acid or generate sulfuric acid as wastes. The reuse of gypsum relies on a purity of gypsum and the gypsum having at least 94% of purity may be currently used in gypsum board, plaster, and the like, but the chemical gypsum which is currently produced has already exceeded a demand of gypsum industry. The fuel gas desulfurization gypsum which is discharged from the coal-fired thermal power plant is byproducts of which about 80 to 90% may be sold, but as the coal-fired thermal power plant is continuously increased and most of the chemical gypsum generated from a fertilizer production company is piled up out in the open, the reuse rate thereof cannot but be reduced, which leads to environmental pollution. One of the methods for resolving the above problems is a recycling method for recovering and reusing the ammonium sulfate and calcite from the waste gypsum.

As a method for producing ammonium sulfate using gypsum and ammonia, there is a method called a Mersberg process which was first suggested at the beginning of 19th century. The process has been experimentally used in 1960s in the United Kingdom and India. Meanwhile, in the US, a process of reproducing ammonium sulfate during a process of producing an ammonium phosphate ($(NH_4)_3PO_4$) fertilizer at the beginning of the 1960s has been tested. It was reported that a typical reaction condition is maintained at 70° C. for 5 hours and a conversion rate reaches about 95%. Recently, a technology of producing ammonium sulfate and calcite by reacting ammonium carbonate ($(NH_4)_2CO_3$) with gypsum by United States Geological Survey (Chou et al., 2005) has been researched. However, in this research, since an excessive amount of ammonium is injected and an endothermic reaction is used, more reaction cost may spend than a current international price of ammonium sulfate, such that it may be difficult to secure economic efficiency. Further, an initial temperature of the reaction becomes 50 to 60° C. and the recovery rate is low as 83%. Unfortunately, the international price of ammonium sulfate suddenly increased by about 30%; this negates the Mersberg process to be performed with economic efficiency by using the general chemical reaction as in the above-mentioned conditions. However, since all the chemical companies use byproducts to produce the ammonium sulfate internationally distributed currently, a sudden increase in the price may be minimal compared to the overall price of the process.

In the country, research for producing calcite as principal products and producing ammonium sulfate as byproducts by using gypsum for a mineral carbonation reaction by Korea Institute of Geoscience And Mineral Resources in 2008 (Korean Patent Laid-Open Publication No. 10-2010-0008342, published on Jan. 25, 2010, entitled "Sequestration of Carbon Dioxide by the Waste Gypsum") has been conducted.

Further, since (a) a method for separating livestock excretion into solid components and liquid components in mass, (b) a method for collecting a $CO_2$ gas and an ammonia gas, (c) a method for reacting a separated liquid component with a collected $CO_2$ gas and ammonia gas, and the like which are disclosed in Korean Patent No. 10-0723066 (Title of the Invention: Fertilizing Process Of Livestock Excretion And System Thereof) are not practical and concrete and a content of the used ammonia and $CO_2$ is never mentioned in the above Patent, a ratio of the produced calcite and ammonium sulfate may not be confirmed and efficiency is very low, such that the possibility to recycle the produced ammonium sulfate or the possibility to secure economic efficiency of the produced ammonium sulfate is extremely small actually.

Further, "Production of Ammonium Sulfate Using Phosphor-gypsum" (Seoul University, 1983) by Shin Yoon Kyeung, which is known prior to this application, describes a method for producing ammonium sulfate by using ammonium carbonate and gypsum as raw materials, but the reaction is a two step reaction in which (a) ammonium carbonate is first produced and (b) the produced ammonium carbonate is reacted with gypsum, and therefore the process is complicated and the reaction of ammonium carbonate with gypsum is an endothermic reaction and therefore requires heat (see the following Reaction Formula 1). Further, the method proposed by Shin Yoon Kyeung does not mention the production efficiency of ammonium sulfate and calcite and uses a stoichiometric composition to be slightly far from recycling.

Reaction Formula 1

Further, if gypsum, ammonia, and $CO_2$ are mixed with one another at a stoichiometric ratio and are reacted with one another, when considering the price and the reaction cost and the reaction efficiency of the raw materials, the economic efficiency may not be secured, and therefore the process cannot but be limited to a scientific meaning. For example, if it is assumed that 100,000 tons/year of gypsum is processed, a loss from about 20 billion won to over about 50 billion won is anticipated in computation.

As described above, the method of producing ammonium sulfate by using gypsum has been suggested and attempted from a long time ago. However, when starting materials are not injected at a specific ratio so as to produce an ammonium sulfate fertilizer by using the gypsum, a purity of calcite and ammonium sulfate which are post-reaction products is reduced and the reaction efficiency and recovery rate are reduced, such that production costs may be increased. However, the ammonium sulfate currently distributed at home and abroad is produced by using industry byproducts without exception and therefore is much cheaper than a commonsensical price. That is, since the ammonium sulfate produced by using the gypsum is absolutely disadvantageous in the contention with the ammonium sulfate which is being currently distributed, the ammonium sulfate produced by using the gypsum may not be recycled and the process of converting the gypsum into the ammonium sulfate may be meaningless.

DISCLOSURE

Technical Problem

An object of the present invention is to provide a recycling method for producing ammonium sulfate and calcite while securing economic efficiency, by producing two reaction products, that is, the ammonium sulfate and the calcite to a high purity so that an efficient reaction of minimizing manufacturing costs like optimization of an amount of injected raw materials, and the like and the two reaction products may be industrially used.

To achieve the above object, high-purity reaction resultants are produced by maximizing reaction efficiency. In particular, an exemplary embodiment of the present invention considers processing gypsum, ammonia, and $CO_2$ in mass as a precondition, which is more important. For example, the purity of calcite is equal to or more than 95% so as to be industrially reused, but when the purity of calcite is equal to or less than 95%, the calcite has little economic efficiency or becomes wastes, which incurs processing costs. Further, a more important problem is that ammonia of at least about 10% is lost since the recovery rate of ammonium sulfate is at most 90% when the purity of calcite is low, for example, when the purity of calcite is 90%. At the same time, since the calcite needs to be processed as wastes, both of the calcite and the ammonium sulfate cannot but be recycled. That is, a carbonation reaction of gypsum automatically reduces the recovery rate of ammonium sulfate when the purity of calcite is low. The ammonia occupies about 80 to 90% of production costs of the ammonium sulfate in a starting material portion, such that when the recovery rate of ammonium sulfate is 90%, a sum of costs which do not recycle the ammonia and the calcite lost at the time of processing about 1,000,000 tons of gypsum reaches from 30 billion won to over 50 billion won and therefore the recycling is meaningless (wholesale price of ammonia: 120,000 won/ton; factory price of ammonium sulfate: 250,000 won/ton; limestone for FGD: 32,000 won/ton, based on 2010). Therefore, it is advantageous that the purity of calcite needs to be maintained at least 95%.

Further, capturing cost of $CO_2$ is currently 50,000 to 80,000 won/ton internationally, and when 1,000,000 tons of gypsum is processed, at least 200,000 to 400,000 tons of $CO_2$ is required, such that considerable costs are required, and when a supply amount of $CO_2$ is equal to or more than or equal to or less than a predetermined range, the reaction efficiency and purity are reduced as described above, such that the recycling of calcite, ammonium sulfate, and $CO_2$ is impossible.

Means for Solving The Problem

In order to achieve the above objects, the present invention provides a method for producing high-purity calcite and ammonium sulfate, in particular, high-purity calcite and ammonium sulfate of at least 95% by contacting and reacting a predetermined amount of carbon dioxide with a mixture generated by mixing ammonia water with gypsum under a condition of a room temperature and a room pressure. Unless otherwise described herein, it is to be understood that the high purity is equal to or more than 90%, more preferably, 95%.

A carbonate mineralization method proposed in the present invention is an exothermic reaction and therefore does not require heating, in which the calcite ($CaCO_3$) and the ammonium sulfate generated by performing a reaction without mineral dressing for the starting materials have a high purity of at least 95% and therefore may be reused (see the following Reaction Formula 2). Theoretically, 4,000,000 tons/year of gypsum generated in the country processes, separates, and recovers about 1,000,000 tons/year of carbon dioxide, such that 2,400,000 tons/year of calcite and 2,800,000 tons/year of ammonium sulfate may be recycled in addition to positively gaining side effects $2NH_4(OH)+H_2O+CaSO_4+CO_2 \rightarrow CaCO_3+(NH_4)_2SO_4-98KJ$ (exothermic reaction) [Reaction Formula 2]

Phospho-gypsum wasted as wastes includes impurities such as phosphate ore, but a method such as gravity separation may perform refining by separating the gypsum portion from other impurities and obtain the gypsum having a purity of about 99% after performing the refining.

Meanwhile, since fuel gas desulfurization gypsum has a purity of about 96 to 98%, in the present invention, the separate mineral dressing is omitted in terms of saving costs. When the mineral dressing is omitted, if the carbonation reaction efficiency reaches 100%, the calcite having purity from 95 to at least 96% may be recovered, and therefore it may be expected that the recovery rate of ammonium sulfate reaches at most 100%.

Figure 1:
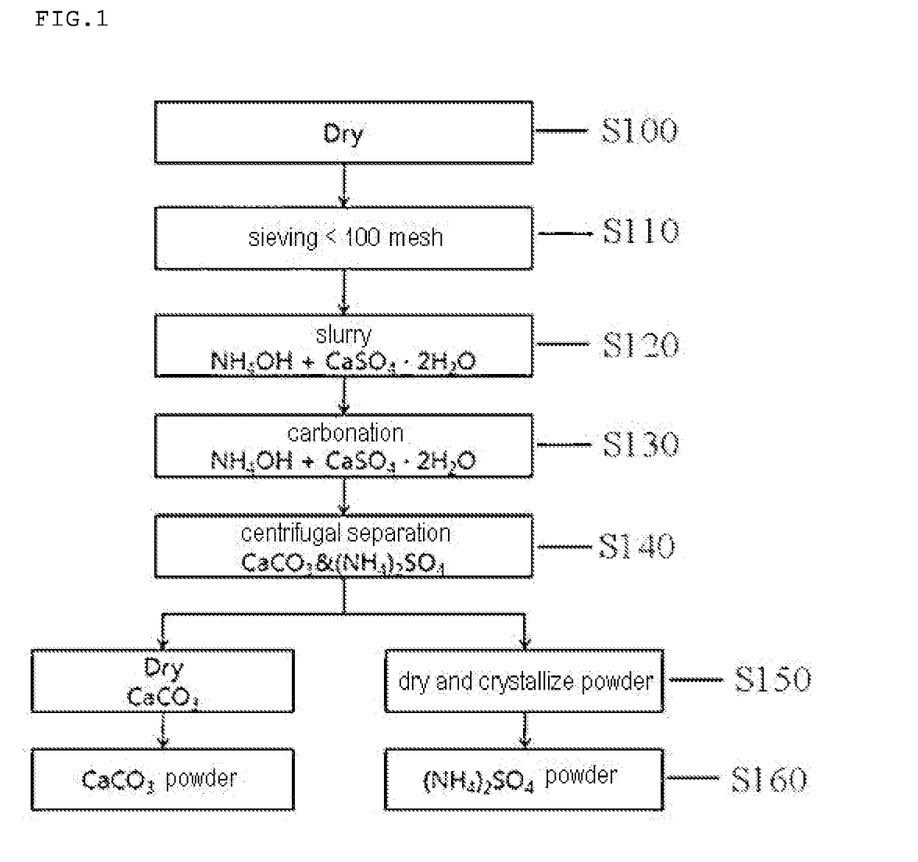
FIG. 1 is a process diagram for describing a method for producing ammonium sulfate by using waste gypsum according to an exemplary embodiment of the present invention.
Figure 2:
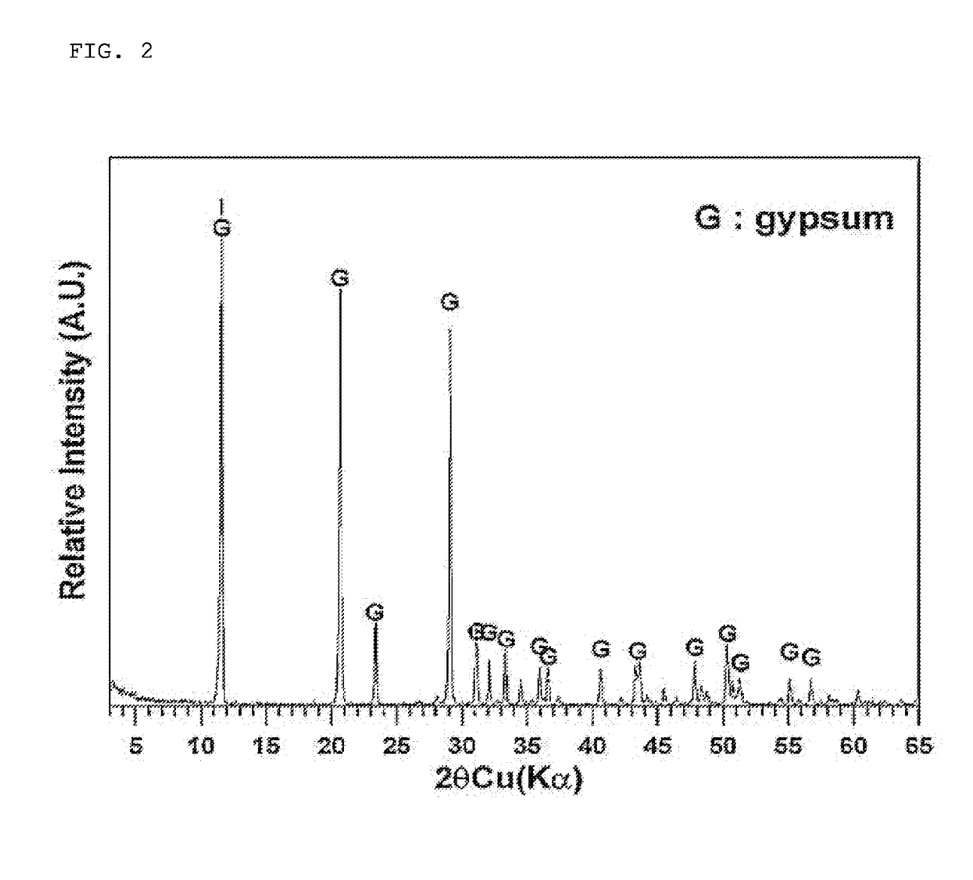
FIG. 2 is a diagram illustrating XRD analysis data of waste gypsum used as raw materials according to the exemplary embodiment of the present invention.
Figure 3:
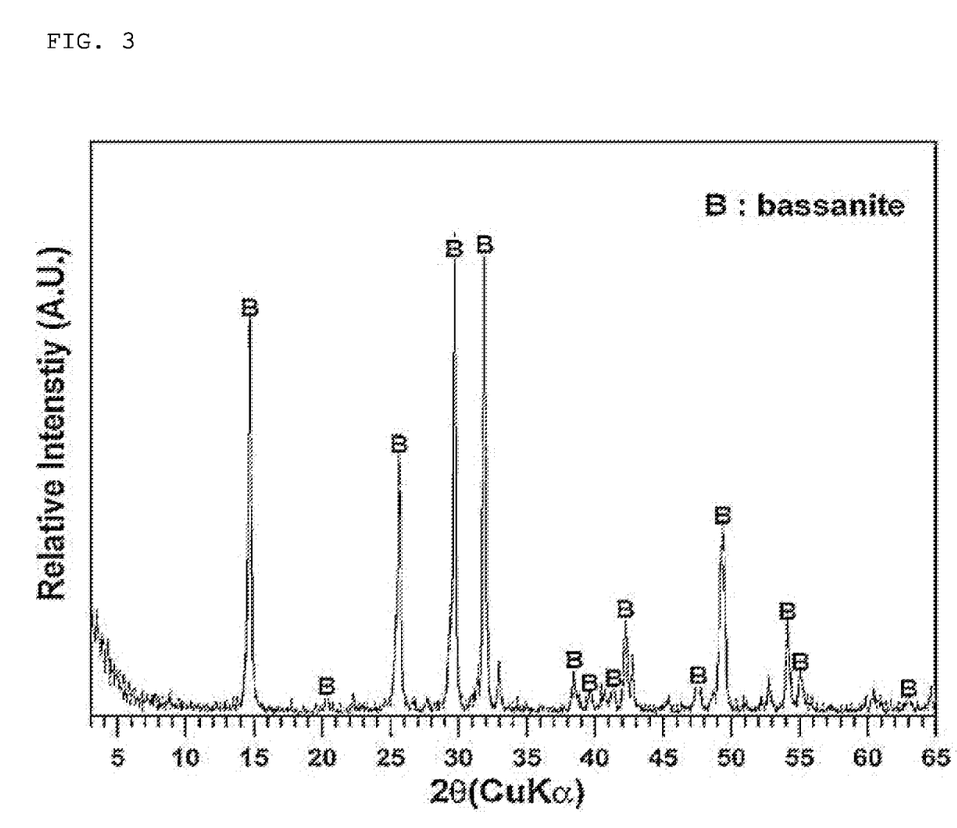
FIG. 3 is a diagram illustrating XRD analysis data of bassanite which is generated by transitioning the waste gypsum used as the raw materials according to the exemplary embodiment of the present invention.

Hereinafter, the present invention will be exemplarily described in more detail with reference to FIG. 1. As an example, the present invention provides a method for composing high-purity calcite with high-purity ammonium sulfate and storing $CO_2$ by using gypsum, including:

a) removing surface water by drying a gypsum powder at 90° C. or less in the state in which the separate mineral dressing is omitted (S100);

b) preparing the gypsum powder of 100 mesh or less (S110);

c) preparing slurry by mixing water, ammonia water, and gypsum at a predetermined ratio at a condition of a room temperature and a room pressure (S120);

d) performing a carbonation reaction by blowing a predetermined amount of carbon dioxide into the slurry (S130);

e) separating the above reaction resultant into the calcite and an ammonium sulfate aqueous solution by a centrifugal separation method, and the like (S140);

f) simply drying the separated calcite and the ammonium sulfate aqueous solution and concentrating, evaporating, and crystallizing the ammonium sulfate in a solution state (S150 and S160).

a) (S100), the surface water of gypsum is merely dried at about 90° C. for 12 to 24 hours. In this case, the gypsum is in the gypsum dehydrate ($CaSO_4.2H_2O$) (FIG. 2) state having tow molecules and when the gypsum is heated for a long period of time, the gypsum may be transitioned to bassanite ($CaSO_4.0.5H_2O$) while crystal water separating from the gypsum and the bassanite which is transitioned once may degrade the carbonation reaction efficiency (FIG. 3).

In the step b) (S110), the dried gypsum dehydrate powder which is separated into only a sample having 100 mesh or less by using an appropriate sieve is used.

The step c) (S120) is a step of preparing slurry by agitating and mixing an appropriate amount of water, ammonia water, and gypsum dehydrate and it is more preferable to use the waste gypsum as the gypsum for various reasons such as cost reduction and environmental protection but the exemplary embodiment of the present invention is not limited thereto and any type of gypsum may be used. The waste gypsum is byproducts which are generated from the fertilizer factory and the coal-fired thermal power plant and includes slight impurities but most thereof is wastes made of gypsum.

The step d) (S130) is a step of producing the calcite and the ammonium sulfate aqueous solution by blowing the carbon dioxide into the slurry mixed in the step c) and performing the carbonation reaction, which is produced by the following Reaction Formula 3.

$$2NH_4(OH)+xH_2O+CaSO_4.2H_2O+CO_2 \rightarrow CaCO_3+ (NH_4)_2SO_4+yH_2O \quad \text{[Reaction Formula 3]}$$

In connection with the main reactions in the steps c) and d), it is more effective to perform the reaction by mixing 100 to 150 parts by weight, more preferably, 100 to 130 parts by weight of ammonia water (content of ammonia: about 25%) with 100 parts by weight of gypsum and it is effective to perform the reaction by mixing 180 to 350 parts by weight, more preferably, 200 to 300 parts by weight of water (or distilled water). In this case, when the ammonia ($NH_4OH$) is less than 100 parts by weight or exceeds 150 parts by weight, the recovery rate of calcite and ammonium sulfate generated after the carbonation reaction is largely reduced.

Therefore, when 100 to 130 parts by weight of ammonia water is used, the recovery rate of calcite and ammonium sulfate generated after the carbonation reaction is increased, in particular, the ammonia water is most effectively consumed and therefore the production cost is largely reduced, which is effective.

In this case, the slurry concentration which is a ratio of solid and liquid corresponds to 20 to 28%. When the slurry concentration is too low, additional cost is generated during the process of concentrating, evaporating, and drying the ammonium sulfate and when the slurry concentration is too high, the reaction efficiency is reduced, and therefore it is preferable to maintain the slurry concentration to 20 to 28%, more preferably, 23 to 26%.

Further, the carbonation reaction is performed by agitating the slurry without the separate heating process at the initial reaction temperature of 5 to 18° C., that is, at the room temperature and the room pressure and when the reaction ends, the initial reaction temperature is increased to 20 to ° C. by the exothermic reaction and the reaction may be effectively performed in the temperature range. When the reaction temperature is 0° C. or less, the reaction efficiency such as the reduction in the recovery rate is reduced.

Meanwhile, the supply amount of $CO_2$ may be represented by a ratio of gypsum and $CO_2$ and when the reaction starts under the condition of the room temperature and the room pressure, it is effective to supply the $CO_2$ gas per 1 g of gypsum in a range of at least 8 cc, preferably, 8 to 20 cc, more preferably, 10 to 15 cc/g. When the $CO_2$ is supplied at the proposed amount or more, the $CO_2$ collected at high cost is wasted and when the $CO_2$ is supplied at the proposed amount or less, the production efficiency of calcite and ammonium sulfate is suddenly reduced and the purity of calcite is equal to or less than 95% and therefore the recovery rate of ammonium sulfate is suddenly reduced, which is not preferable.

The step e) (S140) is a step of separating the slurry into the calcite and the ammonium sulfate after the reaction ends. When the reaction in the step d) ends, the calcite and the ammonium sulfate are generated in the slurry state, in which since the calcite is in a solid state and the ammonium sulfate is in an aqueous solution state, the calcite and the ammonium sulfate in the aqueous state may be separated from each other by using a centrifugal separator, a press filter, or the like. The recovery rate of ammonium sulfate affects the economic efficiency of the overall process.

The method further includes post-processing (S150 and S160) of obtaining a powder by drying the calcite and the ammonium sulfate in the aqueous solution state after the separating. The calcite is not largely affected by temperature, but is dried at 50 to 100° C. to obtain the calcite powder and the ammonium sulfate in the aqueous solution state is evaporated, dried, and crystallized to obtain the ammonium sulfate powder.

Figure 4:
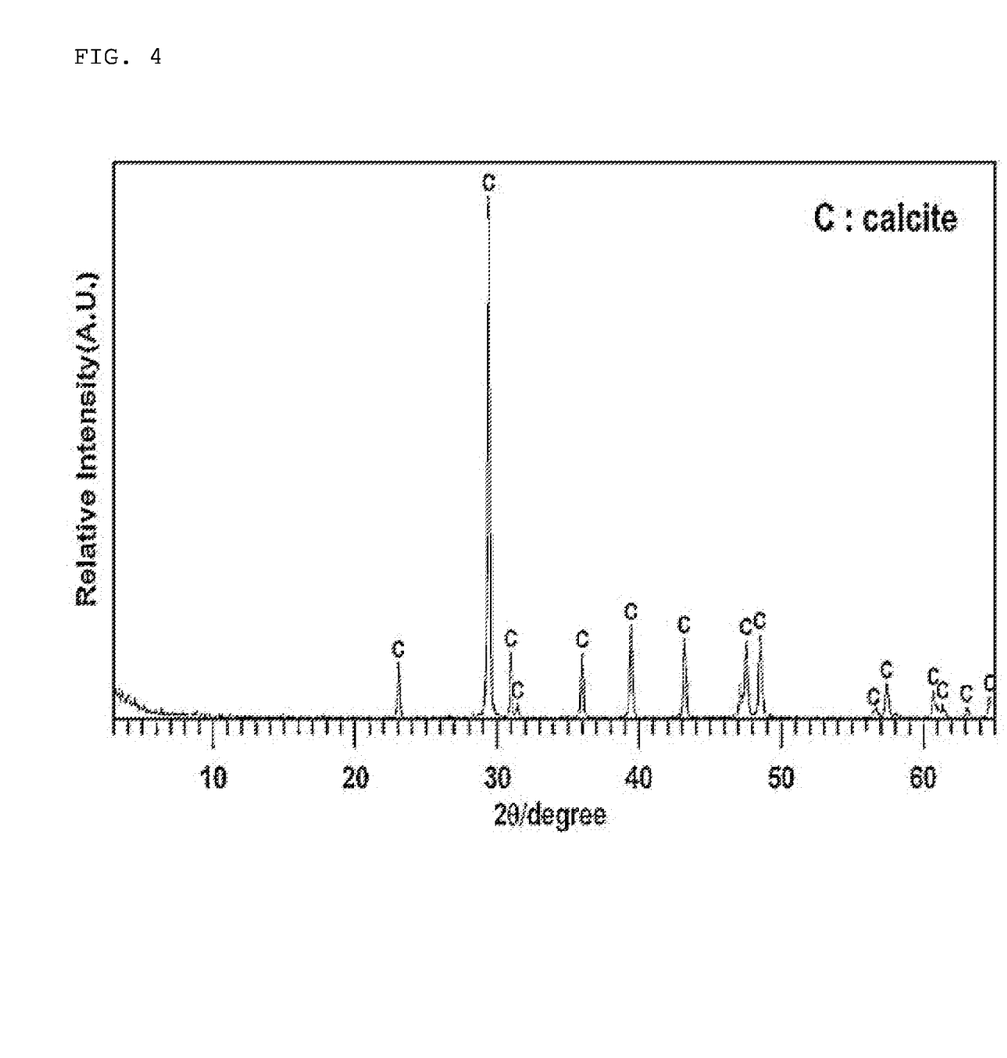
FIG. 4 is a diagram illustrating XRD analysis data of calcite produced by using the waste gypsum according to the exemplary embodiment of the present invention.
Figure 5:
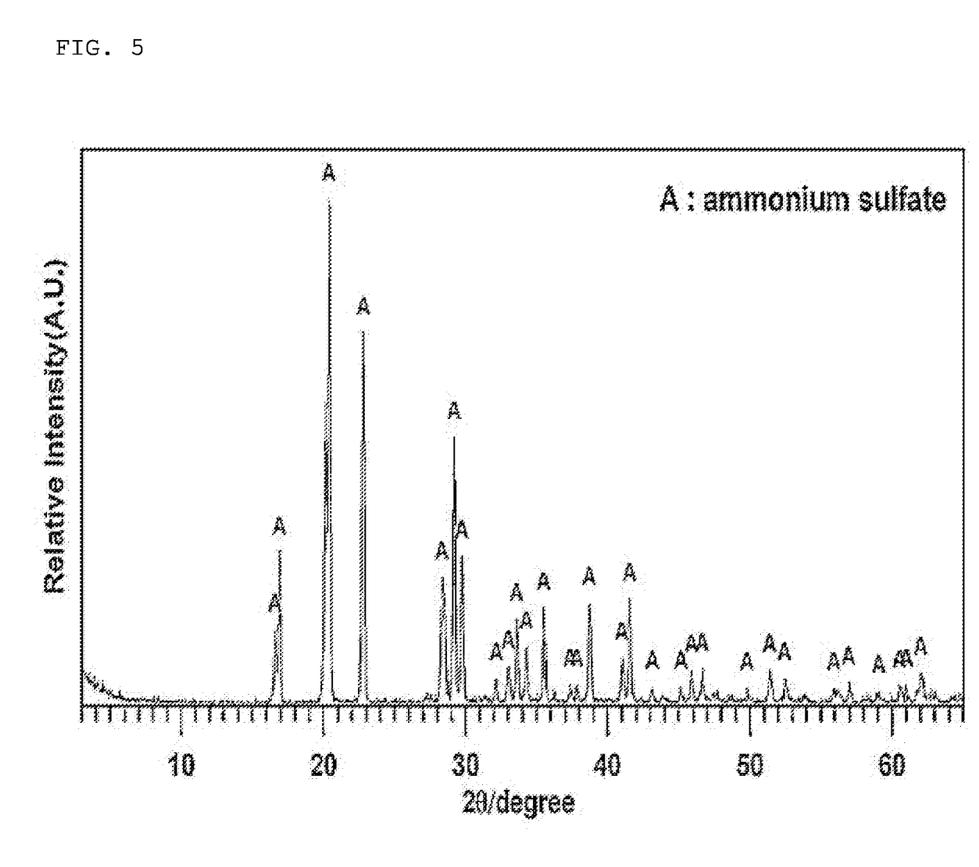
FIG. 5 is a diagram illustrating XRD analysis data of ammonium sulfate produced by using the waste gypsum according to the exemplary embodiment of the present invention.

The dried calcite powder and ammonium sulfate powder may be confirmed by an instrumental analysis such as an X-ray diffraction analysis and FIGS. 4 and 5 illustrate analyzed data of the calcite and the ammonium sulfate which are produced by using the waste gypsum according to the present invention.

As a result of thermal gravimetry for the purity of calcite after the reaction, the purity of calcite represents about 95 to 97%. In this case, the carbonation rate is in a range of 97 to 100%. If the mineral dressing is performed and then the carbonation reaction is performed, the purity of calcite may reach 99%. Further, comparing with a theoretical value, the purity of ammonium sulfate represents about 95%, such that it may be appreciated that efficiency is very high.

Advantageous Effects

According to the exemplary embodiments of the present invention, the method for producing high-purity calcite and ammonium sulfate uses the waste gypsum generated millions of tons annually in the country as raw materials, such that it is possible to obtain the reuse effect of recycling waste resources simultaneously with protecting environment and fundamentally resolve the environmental pollution problem. That is, the economical process of producing recycling high-purity calcite and high-purity ammonium sulfate of at least 95% by using the waste gypsum may be developed. Further, when the carbonation reaction is performed by pre-processing the waste gypsum, the calcite having a purity of about 99% may be recovered.

Further, the method for producing ammonium sulfate is a method for safely storing carbon dioxide in a lattice of mineral and may be less constrained by a place and may permanently operate a disposal facility as compared to a ground disposal, such that it may expect to obtain a separate profit by selling the stored amount of $CO_2$.

BEST MODE

Hereinafter, the present invention will be described with reference to the following Examples. The following Examples are only to describe the present invention, and therefore the present invention is not limited to the following Examples.

Example 1

600 cc of ammonia water (content of ammonia: 25%) and 500 g of gypsum which does not suffer from mineral dressing and is simply dried were put in 1500 cc of water and they were mixed and slurry was agitated at a starting temperature of 15° C. In this case, a slurry concentration corresponded to 24%. Next, the slurry including calcite and ammonium sulfate was produced by reacting carbon dioxide with the slurry for 25 minutes while blowing the carbon dioxide into the slurry at a rate of 5 liter/min.

After the reaction ends, the slurry was subjected to centrifugal separation at a rate of 1000 rpm for 10 minutes by using a centrifugal separator (Union 32R, Hanil) for experiment to separate the calcite in a solid state from the ammonium sulfate in an aqueous solution state.

The experiment was repeated three times by using the same mixing ratio. The separated calcite was dried at 90° C. to obtain 320 g of calcite powder in average and the ammonium sulfate in the aqueous solution state was evaporated and dried while maintaining a temperature of solution at 60° C. or less to obtain 345 g of white ammonium sulfate powder in average.

As a result of performing an X-ray diffraction analysis on the calcite and the ammonium sulfate, since the calcite was represented by d=3.03A (104), 2.285A (113), 2.09A (202) and the ammonium sulfate was represented by d=4.33 (111), 3.94A (200), 3.032A (031), 2.97A (002), it was confirmed that the pure calcite and the pure ammonium sulfate are produced.

Figure 6:
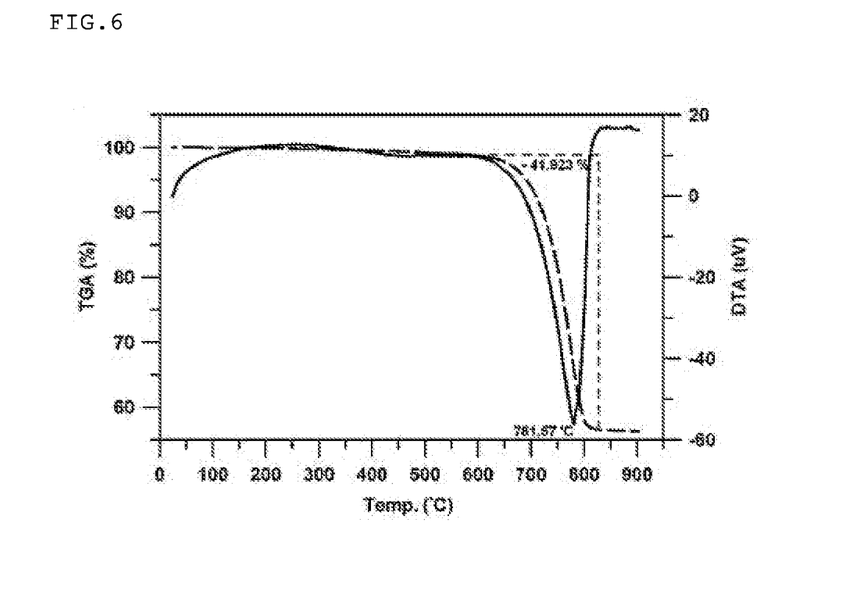
FIG. 6 is a diagram illustrating TGA analysis data of calcite (purity of 95%) produced according to Example 1 of the present invention.
Figure 7:
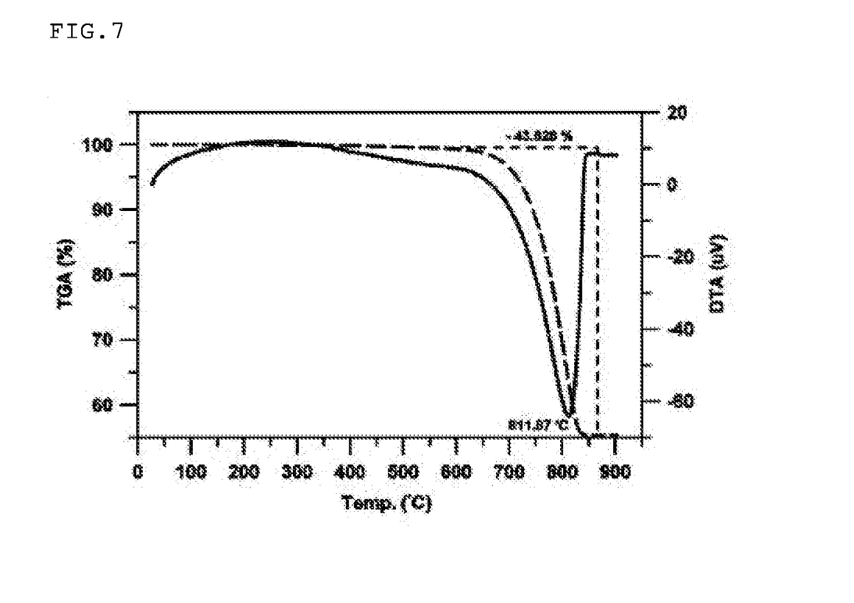
FIG. 7 is a diagram illustrating the TGA analysis data of pure reagent calcite (purity of 99%).

The thermal analysis for each of the calcite sample and the ammonium sulfate sample was performed, which was illustrated in FIG. 6. The endothermic reaction of the calcite sample was shown at a range of 795 to 810° C. and a weight loss thereof was 41.8 to 42.5%. This was analyzed by a decomposition reaction of carbon dioxide and the purity of generated calcite was 96%. The thermal analysis was performed on a pure guaranteed reagent having a purity of 99%, which was illustrated in FIG. 7 and it could be appreciated that a theoretical maximum value is 44% or the weight loss is in a range of 43.7 to 43.8 as a result of the measurement.

Example 2

As in Example 1, 600 cc of ammonia water (content of ammonia: 25%) and 500 g of byproduct gypsum were put in 1500 cc of water and they were mixed and slurry was agitated at the starting temperature of 5° C. Next, the slurry including the calcite and the ammonium sulfate was produced by reacting the carbon dioxide with the slurry for 25 minutes while blowing the carbon dioxide into the slurry at a rate of 5 liter/min.

After the reaction ends, the slurry was subjected to the centrifugal separation by using the same method as the method used in Example 1, dried, and subjected to the XRD and TGA analysis and the weight loss thereof was 41.7 to 42.1% and therefore the purity of calcite was 95.5%. That is, when the reaction is performed in a room temperature range, the purity of calcite was little changed and therefore heating was unnecessary.

Comparative Example 1

As in Example 1, 600 cc of ammonia water (content of ammonia: 25%) and 500 g of byproduct gypsum were put in 1500 cc of water and they were mixed and slurry was agitated at the room temperature and the room pressure. Next, the slurry including the calcite and the ammonium sulfate was produced by reacting the carbon dioxide with the slurry for 30 minutes while blowing the carbon dioxide into the slurry at a rate of 3 liter/min. The temperature after the reaction was increased 27° C.

Figure 8:
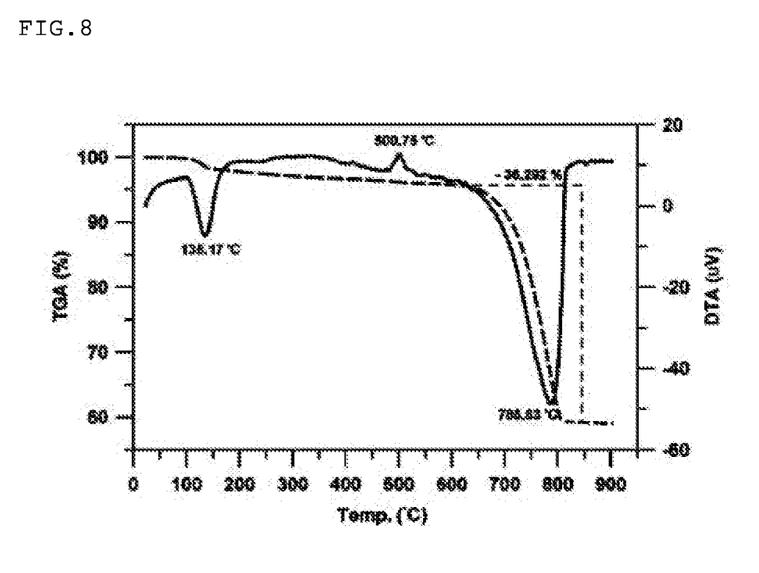
FIG. 8 is a diagram illustrating the TGA analysis data of calcite (purity of 83%) produced according to Comparative Example 1 of the present invention.

After the reaction ends, the slurry was subjected to the centrifugal separation by using the same method as the method used in Example 1, dried, and subjected to the XRD and TGA analysis, such that 342 g of calcite powder was obtained in average and 315 g of ammonium sulfate powder was obtained in average. Since the weight loss was 35.9 to 37.4%, the purity of calcite corresponded to 83.6 to 87.1%. FIG. 8 illustrates the TGA result, and the calcite includes a considerable amount of impurity and therefore a peak thereof was observed at 135° C. and 500° C.

That is, when the supply amount of carbon dioxide per hour is reduced to 5 liter/min or less, the generation rate of calcite was increased and the purity was largely reduced even when the reaction time is increased. In this case, since the recovery rate of ammonium sulfate is at most 85%, it could be appreciated that the ammonium sulfate may not be recycled.

Example 3

As in Example 1, 600 cc of ammonia water (content of ammonia: 25%) and 500 g of byproduct gypsum were put in 1500 cc of water and they were mixed and slurry was agitated at the room temperature and the room pressure. Next, the slurry including the calcite and the ammonium sulfate was produced by reacting the carbon dioxide with the slurry for 25 minutes while blowing the carbon dioxide into the slurry at a rate of 10 liter/min.

After the reaction ends, the slurry was subjected to the centrifugal separation by using the same method as the method used in Example 1, dried, and subjected to the XRD and TGA analysis and in this case, the weight loss thereof was 41.9 to 42.2% and therefore the purity of calcite corresponded to 95 to 96%. That is, even though the $CO_2$ two times as much as Examples is supplied in the room temperature range, the purity of calcite is not largely changed.

Comparative Example 2

As in Example 1, 600 cc of ammonia water (content of ammonia: 25%) and 500 g of byproduct gypsum were put in 1000 cc of water and they were mixed and slurry was agitated at the room temperature and the room pressure. In this case, the slurry concentration corresponded to 31 (w/v) %. Next, the slurry including the calcite and the ammonium sulfate was produced by reacting the carbon dioxide with the slurry for 25 minutes while blowing the carbon dioxide into the slurry at a rate of 5 liter/min.

After the reaction ends, the slurry was subjected to the centrifugal separation by using the same method as the method used in Example 1, dried, and subjected to the XRD and TGA analysis and in this case, the weight loss thereof was 40.0 to 40.3% and therefore the purity of calcite corresponded to 90.5%. That is, even though the $CO_2$ is supplied at 5 liter/min, the purity of calcite was slightly reduced when the slurry concentration is equal to or more than 30%.

Comparative Example 3

As in Example 1, 600 cc of ammonia water (content of ammonia: 25%) and 500 g of byproduct gypsum were put in 2000 cc of water and they were mixed and slurry was agitated at the room temperature and the room pressure. In this case, a slurry concentration corresponded to 19%. Next, the slurry including the calcite and the ammonium sulfate was produced by reacting the carbon dioxide with the slurry for 25 minutes while blowing the carbon dioxide into the slurry at a rate of 5 liter/min.

After the reaction ends, the slurry was subjected to the centrifugal separation by using the same method as the method used in Example 1, dried, and subjected to the XRD and TGA analysis and in this case, the weight loss thereof was 41.7 to 42.1% and therefore the purity of calcite corresponded to 95.5%. That is, when the slurry concentration is equal to or less than 20%, the purity of calcite is not largely changed but it was anticipated that the drying and evaporation cost of the ammonium sulfate is increased.

1 g of gypsum is equal to or less than a range of 10 to 13 cc/min, and therefore the purity of calcite was suddenly reduced.

Comparative Example 5

As in Example 1, 900 cc of ammonia water (content of ammonia: 25%) and 780 g of byproduct gypsum were put in 1500 cc of water and they were mixed and slurry was agitated at the room temperature and the room pressure. Next, the slurry including the calcite and the ammonium sulfate was produced by reacting the carbon dioxide with the slurry for 25 minutes while blowing the carbon dioxide into the slurry at a rate of 9 liter/min.

After the reaction ends, the slurry was subjected to the centrifugal separation by the same method as the method used in Example 1, dried, and subjected to the XRD and TGA analysis and a considerable amount of non-reaction gypsum remained. In this case, the weight loss was 38.2 to 38.5% and therefore the purity of calcite corresponded to 84.5%. That is, 100 to 150 parts by weight of ammonia water was mixed with 100 parts by weight of gypsum and even though the $CO_2$ gas supplied per 1 g of gypsum is maintained in a range of 10 to 13 cc/min, the purity of calcite was suddenly reduced when the slurry concentration is increased at least 30%.

Composition ratios and results of the above Examples and the Comparative Examples were shown in the following Table 1.

TABLE 1

| | Water (Distilled Water) (cc) | Ammonia Water (cc) | Gypsum (g) | $CO_2$ Flow Rate (L/min) | Initial Reaction Temperature °C. | Slurry Concentration % | Purity of Calcite % |
|---|---|---|---|---|---|---|---|
| Example 1 | 1500 | 600 | 500 | 5 | 15 | 24 | 96.0 |
| Example 2 | 1500 | 600 | 500 | 5 | 5 | 24 | 95.5 |
| Comparative Example 1 | 1500 | 600 | 500 | 3 | 15 | 24 | 84.5 |
| Example 3 | 1500 | 600 | 500 | 10 | 15 | 24 | 95.5 |
| Comparative Example 2 | 1000 | 600 | 500 | 5 | 15 | 31 | 90.5 |
| Comparative Example 3 | 2000 | 600 | 500 | 5 | 15 | 19 | 95.5 |
| Comparative Example 4 | 1500 | 900 | 780 | 5 | 15 | 33 | 84.5 |
| Comparative Example 5 | 1500 | 900 | 780 | 9 | 15 | 33 | 86.0 |

Comparative Example 4

As in Example 1, 900 cc of ammonia water (content of ammonia: 25%) and 780 g of byproduct gypsum were put in 1500 cc of water and they were mixed and slurry was agitated at the room temperature and the room pressure. In this case, a slurry concentration corresponded to 33%. Next, the slurry including the calcite and the ammonium sulfate was produced by reacting the carbon dioxide with the slurry for 25 minutes while blowing the carbon dioxide into the slurry at a rate of 5 liter/min.

Figure 9:
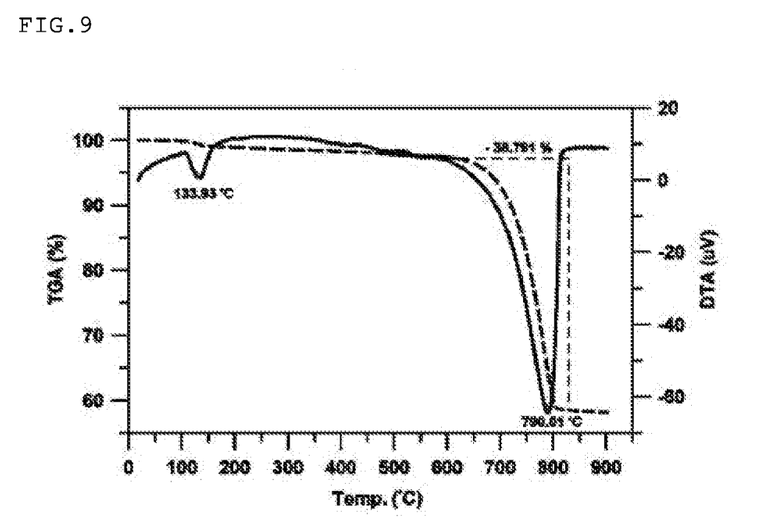
FIG. 9 is a diagram illustrating the TGA analysis data of calcite (purity of 87%) produced according to Comparative Example 4 of the present invention.

After the reaction ends, the slurry was subjected to the centrifugal separation by the same method as the method used in Example 1, dried, and subjected to the XRD and TGA analysis and a considerable amount of non-reaction gypsum remained. In this case, the weight loss was 37.3 to 38.6% and therefore the purity of calcite corresponded to 86%. FIG. 9 illustrates the TGA result, and the calcite includes a considerable amount of impurity and therefore a peak thereof was observed at 134° C. That is, even thought a ratio of the gypsum and the ammonia water is maintained at 1.15, when the slurry concentration is increased, the $CO_2$ gas supplied per Although the preferred embodiments of the present invention have been disclosed for illustrative purposes, those skilled in the art will appreciate that various modifications, additions and substitutions are possible, without departing from the scope and spirit of the invention as disclosed in the accompanying claims. Accordingly, such modifications, additions and substitutions should also be understood to fall within the scope of the present invention

DETAILED DESCRIPTION OF MAIN ELEMENTS

S100: Remove surface water by drying waste gypsum at 90° C. or less

S110: Prepare waste gypsum as raw materials at 100 mesh or less

S120: Weigh amount of waste gypsum, ammonia water, and water and mix them with slurry S130: Carbonate gypsum by reacting slurry with carbon dioxide and prepare ammonium sulfate in aqueous solution state S140: Separate produced calcite from ammonium sulfate in aqueous solution state S150 and S160: Obtain powder by independently drying or crystallizing separated calcite and ammonium sulfate in aqueous solution state, respectively

The invention claimed is:

1. A method for producing high-purity calcite and ammonium sulfate having a purity of at least 95%, comprising: mixing water, ammonia water and gypsum to prepare a slurry and performing a carbonation reaction by adding a predetermined amount of carbon dioxide to the slurry,
 wherein an initial reaction temperature of the slurry is 5 to 18° C.

2. The method of claim 1, wherein the slurry comprises 180 to 350 parts by weight of water for 100 parts by weight of gypsum.

3. The method of claim 1, wherein the carbon dioxide is supplied at a flow rate of 8 to 20 cc/min per 1 g of gypsum.

4. The method of claim 1, wherein a concentration of the slurry is 20 to 28 (w/v) %.

5. The method of claim 1, wherein the slurry comprises 100 to 150 parts by weight of ammonia water for 100 parts by weight of gypsum.

* * * * *